(12) United States Patent
Chen et al.

(10) Patent No.: US 10,935,808 B2
(45) Date of Patent: Mar. 2, 2021

(54) ELECTROMAGNETIC DRIVING MODULE AND LENS DRIVING DEVICE USING THE SAME

(71) Applicant: TDK TAIWAN CORP., Taoyuan (TW)

(72) Inventors: Yi-Ho Chen, Taoyuan (TW);
Kuo-Chun Kao, Taoyuan (TW);
Yi-Hsin Nieh, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 118 days.

(21) Appl. No.: 16/190,503

(22) Filed: Nov. 14, 2018

(65) Prior Publication Data

US 2019/0079310 A1 Mar. 14, 2019

Related U.S. Application Data

(63) Continuation of application No. 15/278,418, filed on Sep. 28, 2016, now Pat. No. 10,162,190.

(Continued)

(30) Foreign Application Priority Data

Feb. 4, 2016 (TW) ................................ 105103694

(51) Int. Cl.
*G02B 27/64* (2006.01)
*H02K 41/035* (2006.01)
*G02B 7/02* (2021.01)

(52) U.S. Cl.
CPC ....... *G02B 27/646* (2013.01); *H02K 41/0356* (2013.01); *G02B 7/021* (2013.01); *G02B 7/023* (2013.01)

(58) Field of Classification Search
CPC .... G02B 27/62; G02B 27/646; G02B 27/648; G02B 27/0006; G02B 7/02; G02B 7/04;
(Continued)

(56) References Cited

U.S. PATENT DOCUMENTS

| 8,049,815 B2 | 11/2011 | Huang et al. |
| 2012/0081559 A1 * | 4/2012 | Sato .......................... G03B 5/00 348/208.11 |

(Continued)

FOREIGN PATENT DOCUMENTS

| CN | 101566714 B | 3/2012 |
| CN | 202854389 U | 4/2013 |
| TW | M505615 U | 7/2015 |

OTHER PUBLICATIONS

Taiwanese Office Action dated Dec. 8, 2016 from corresponding Application No. 105103694; 6 pages.

*Primary Examiner* — Mustak Choudhury
(74) *Attorney, Agent, or Firm* — Muncy, Geissler, Olds & Lowe, P.C.

(57) ABSTRACT

An electromagnetic driving module is provided which includes a frame, a magnetic element, a base, and an OIS driving coil. The frame surrounds a main axis. The magnetic element is disposed on the frame and has an engaging surface in contact with the frame. The base is arranged to be adjacent to the frame. The OIS driving coil for driving the movement of the frame in a direction that is perpendicular to the main axis is disposed on the base and arranged to correspond to the magnetic element.

14 Claims, 8 Drawing Sheets

Related U.S. Application Data

(60) Provisional application No. 62/236,610, filed on Oct. 2, 2015.

(58) Field of Classification Search
CPC . G02B 7/08; G02B 7/09; G02B 7/021; G02B 7/022; G02B 7/023; G02B 7/026; G02B 3/10; G02B 17/00; G02B 17/02; G02B 17/08; G02B 13/34; G02B 13/36; G02B 13/0015; G02B 13/001; H02K 41/03; H02K 41/031; H02K 41/0354; H02K 41/0356; H02K 7/14; H02K 33/18; H04N 5/335; H04N 5/2251–2258; H04N 5/23212; H04N 5/23248; H04N 5/23264; H04N 5/23287
See application file for complete search history.

(56) References Cited

U.S. PATENT DOCUMENTS

| | | | |
|---|---|---|---|
| 2015/0177479 A1* | 6/2015 | Lee | G03B 3/10 359/824 |
| 2016/0070115 A1 | 3/2016 | Miller et al. | |

* cited by examiner

ELECTROMAGNETIC DRIVING MODULE AND LENS DRIVING DEVICE USING THE SAME

CROSS REFERENCE TO RELATED APPLICATIONS

This application is a Continuation of application Ser. No. 15/278,418 filed on Sep. 28, 2016, which claims the benefit of provisional U.S. Patent Application No. 62/236,610 filed on Oct. 2, 2015 and Taiwan Patent Application No. 105103694 filed on Feb. 4, 2016, the entirety of which is incorporated by reference herein.

BACKGROUND OF THE DISCLOSURE

Field of the Invention

The present invention relates to a driving module and a lens driving device using the same, and more particularly to an electromagnetic driving module which converts electrical energy into mechanical energy and a lens device using the same.

Description of the Related Art

Some electronic devices are equipped with a driving module to drive an element to move a predetermined distance. For example, an electronic device having an image-capturing function usually includes a driving module to generate driving power. One or more optical lens units of the electronic device are driven by the driving power to move along an optical axis, so as to facilitate auto-focus and auto-zoom controls.

However, since the driving module includes a complex driving member, such as stepper motor, ultrasonic motor, piezoelectric actuators, etc. to generate the driving power and the driving power has to be transmitted by a number of transmission elements, it is not easy to assemble and the manufacturing cost is high. In addition, a conventional driving module is also large in size and has a high power consumption due to its complex construction.

On the other hand, in a conventional electromagnetic driving module, a supporting portion is formed on an outer side of the magnet so as to prevent the magnet from being dropped during impact. However, the size of the electromagnetic driving module is increased due to the fact that the supporting portion has a significant thickness.

BRIEF SUMMARY OF THE DISCLOSURE

Accordingly, one objective of the present disclosure is to provide an electromagnetic driving module, which is configured to provide a driving force to drive an element such as a lens module positioned in the electromagnetic driving module to move. Another objective of the present disclosure is to provide a microminiaturized electromagnetic driving module.

According to some embodiments of the disclosure, the electromagnetic driving module includes a frame, a magnetic element, a base, and an OIS driving coil. The frame surrounds a main axis. The magnetic element is disposed on the frame and has a front surface and a rear surface. The front surface is opposite to the front surface and is farther away from the main axis than the rear surface. The area of the front surface is smaller than the area of the rear surface. The base is adjacent to the frame. The OIS driving coil is arranged corresponding to the magnetic element and disposed on the base. The OIS driving coil allows an electric current to pass through so as to drive the movement of the frame in a direction that is perpendicular to the main axis.

In some embodiments, the front surface of the magnetic element is flush with the outer surface of the frame.

In some embodiments, electromagnetic driving module further includes a lateral housing member extending along a direction that is parallel to the main axis. The smallest distance between the lateral housing member and the outer surface of the frame is less than or equal to the distance between lateral housing member and the magnetic element.

In some embodiments, the frame includes an inner side block portion and an outer side block portion. The outer side block portion is arranged to correspond to the inner side block portion and spaced from the inner side block portion by a gap. A receiving groove is defined between the inner side block portion and the outer side block portion, and the magnetic element is placed in the receiving groove.

In some embodiments, the magnetic element includes an engaging surface, and the engaging surface is immediately connected to the front surface and forms an obtuse angle with the front surface. The rear surface of the magnetic element is in contact with the inner side block portion, and the engaging surface is in contact with the outer side block portion.

Alternatively the magnetic element includes an engaging surface, and the engaging surface extends parallel to the front surface. The rear surface of the magnetic element is in contact with the inner side block portion, and the engaging surface is in contact with the outer side block portion.

In some embodiments, the magnetic element includes a first segment having a rectangular cross section and a second segment having a trapezoidal cross section and connected to the first segment. The rear surface is located at the first segment, and the front surface is located at the second segment.

Alternatively, the magnetic element includes a first segment having a rectangular cross section and a second segment having a rectangular cross section and connected to the first segment. The rear surface is located at the first segment, and the front surface is located at the second segment.

In some embodiments, the electromagnetic driving module further includes a lens holder and a focusing driving coil. The lens holder is arranged on the main axis, wherein the frame surrounds the lens holder. The focusing driving coil is arranged corresponding to magnetic element and disposed on the lens holder. The focusing driving coil allows an electric current to pass through so as to drive the movement of the lens holder along the main axis.

Another objective of the present disclosure is to provide a lens driving device using the electromagnetic driving module described in any one of the above embodiments. The lens driving device includes a lens assembly, wherein a frame surrounds the lens assembly, and the optical axis of the lens assembly is aligned with the main axis.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

Figure 1:
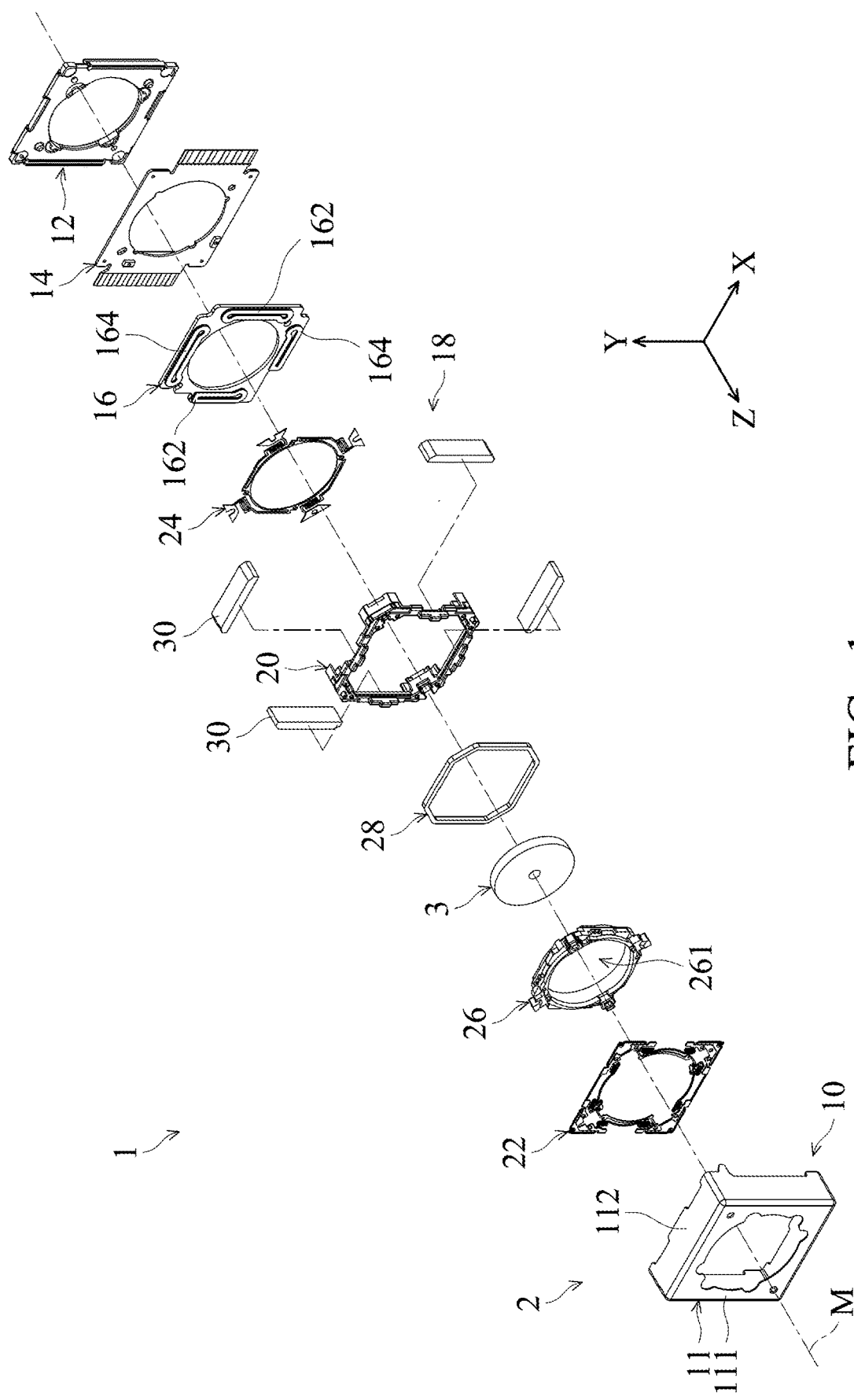
FIG. 1 shows an exploded view of a lens driving device, in accordance with some embodiments.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate not only that the layer directly contacts the other layer, but also that the layer does not directly contact the other layer, there being one or more intermediate layers disposed between the layer and the other layer.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

FIG. 1 shows an exploded view of a lens driving module 1. In some embodiments, the lens driving module 1 includes an electromagnetic driving module 2 and a lens assembly 3.

The electromagnetic driving module 2 is configured to support the lens assembly 3 and to control the movement of the lens assembly 3. In some embodiments, the electromagnetic driving module 2 includes a fixed portion 10, a circuit board 14, a coil substrate 16, and a movable portion 18 that are arranged along a main axis M. The elements of the electromagnetic driving module 2 can be added to or omitted, and the invention should not be limited by the embodiment.

In some embodiments, the fixed portion 10 includes a housing 11 and a base 12. In some embodiments, the housing 11 includes an upper housing member 111 and a lateral housing member 112. The upper housing member 111 has a rectangular shape. The lateral housing member 112 extends from the edges of the upper housing member 111 toward the base 12. The base 12 has a shape that corresponds to the shape of the upper housing member 111. The base 12 is connected to the housing 11 via the lateral housing member 112. The other elements of the electromagnetic driving module 2 may be positioned in a place defined by the housing 11.

The circuit board 14 is positioned on the base 12 and is configured to electrically connect a control module (not shown in figures) to the electric elements of the electromagnetic driving module 2. The coil substrate 16 is positioned on the circuit board 14 and includes a number of OIS (optical image stabilization) driving coils, such as two OIS driving coils 162 and two OIS driving coils 164. The OIS driving coils 162 and 164 are electrically connected to the circuit board 14 and are configured to drive the movement of the movable portion 18 in a direction that is perpendicular to the main axis M. In some embodiments, as shown in FIG. 1, the two OIS driving coils 162 are respectively positioned adjacent to two lateral sides of the base 12 that are arranged along the X direction. In addition, the two OIS driving coils 164 are respectively positioned adjacent to two lateral sides of the base 12 that are arranged along the Y direction.

The movable portion 18 is configured to support the lens assembly 3 to enable the moment of the lens assembly 3 relative to the base 12. In some embodiments, the movable portion 18 includes a frame 20, an upper spring sheet 22, a lower spring sheet 24, a lens holder 26, a focusing driving coil 28, and a number of magnetic elements, such as four magnetic elements 30. The elements of the movable portion 18 can be added to or omitted, and the invention should not be limited by the embodiment.

Figure 2:
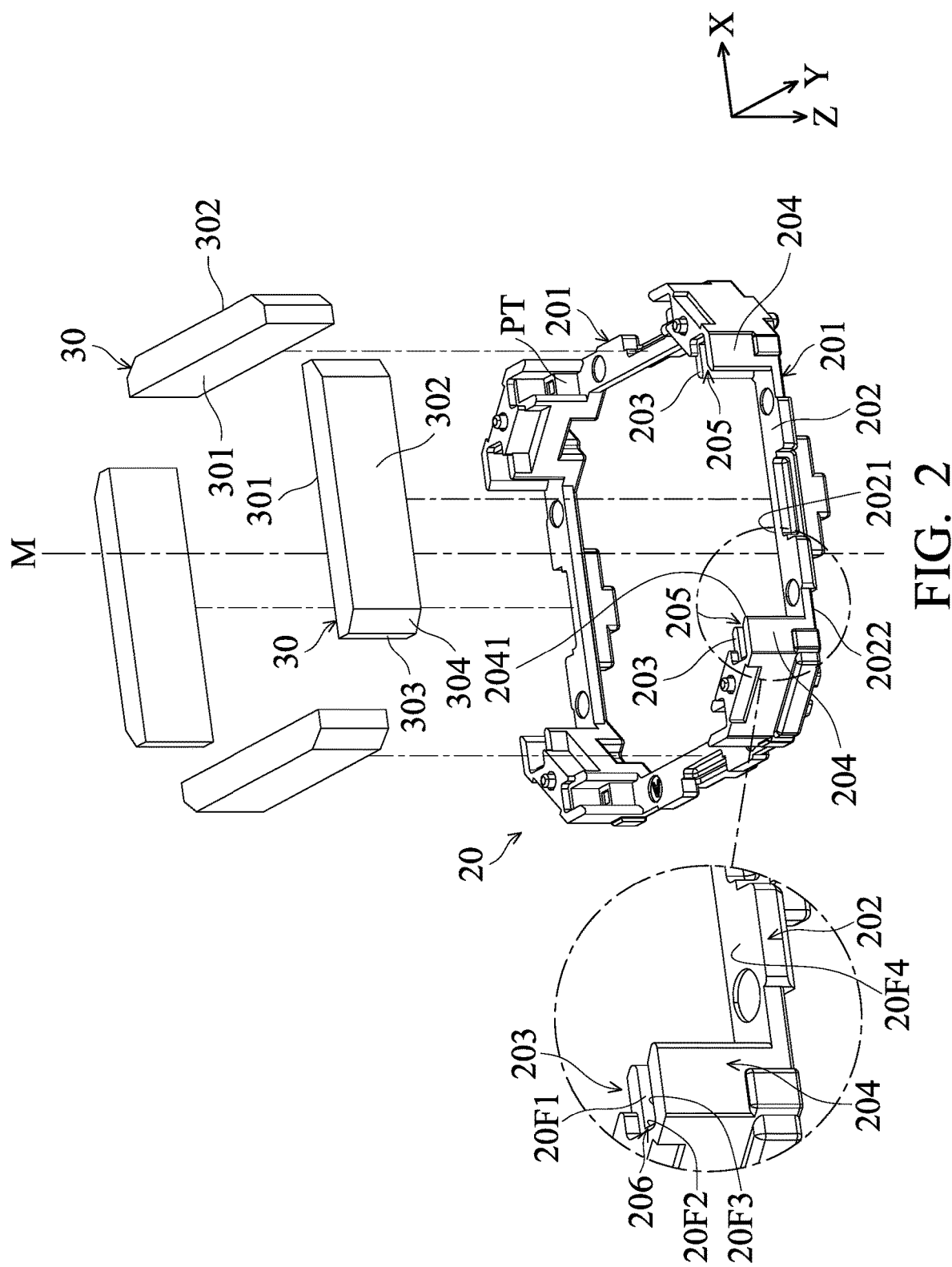
FIG. 2 shows an exploded view of partial elements of an electromagnetic driving module, in accordance with some embodiments.

Referring to FIG. 2, the frame 20 includes four lateral frame members 201 surrounding the main axis M and connected to one another. Each of the lateral frame members 201 includes a bottom portion 202, two inner side block portions 203, and two outer side block portions 204. The two inner side block portions 203 and the two outer side block portions 204 are positioned on the bottom portion 202 and define two receiving grooves 205 for receiving the magnetic element 30.

Specifically, the two inner side block portions 203 are adjacent to the inner surface 2021 of the bottom portion 202 and separated from each other by a distance. In addition, the two outer side block portions 204 are adjacent to the outer surface 2022 of the bottom portion 202 and separated from the other by a distance. Each receiving groove 205 is respectively defined between one of the inner side block portion 203 and the corresponding outer side block portions 204. In some embodiments, a protruding stage PT is disposed in the receiving groove 205. In some embodiments, the side of each outer side block portion 204 that faces the other outer side block portions 204 has a cutting edge 2041 for facilitating the positioning of the magnetic element 30 and improving the stability of the magnetic element 30. In some embodiments, the two inner side block portions 203 are flush with the inner surface 2021 of the bottom portion 202, and the two outer side block portions 204 are flush with the outer surface 2022 of the bottom portion 202.

However, the configuration of the lateral frame member 201 should not be limited to the above embodiments. In some non-illustrated embodiments, there is only one inner side block portion formed on the lateral frame member. The inner side block portion is adjacent to the inner surface of the bottom portion and faces the two outer side block portions. Two receiving grooves are respectively defined between two sides of the inner side block portion and the two outer side block portions.

In some embodiments, the lens holder 26 is arranged on the main axis M, and the frame 20 surrounds the lens holder 26. A passage 261 for receiving the lens assembly penetrates the lens holder 26. The upper spring sheet 22 and the lower spring sheet 24 are respectively fixed on the upper surface and the lower surface of the fame 20, and the lens holder 26 is disposed between the upper spring sheet 22 and the lower spring sheet 24. The upper spring sheet 22 and the lower spring sheet 24 are arranged so that the lens holder 26 can be driven to move relative to the stationary member 10 along the main axis M. The focusing driving coil 28 is disposed on the outer surface of the lens holder 26 and is electrically connected to the upper spring sheet 22 or the lower spring sheet 24.

Figure 3:
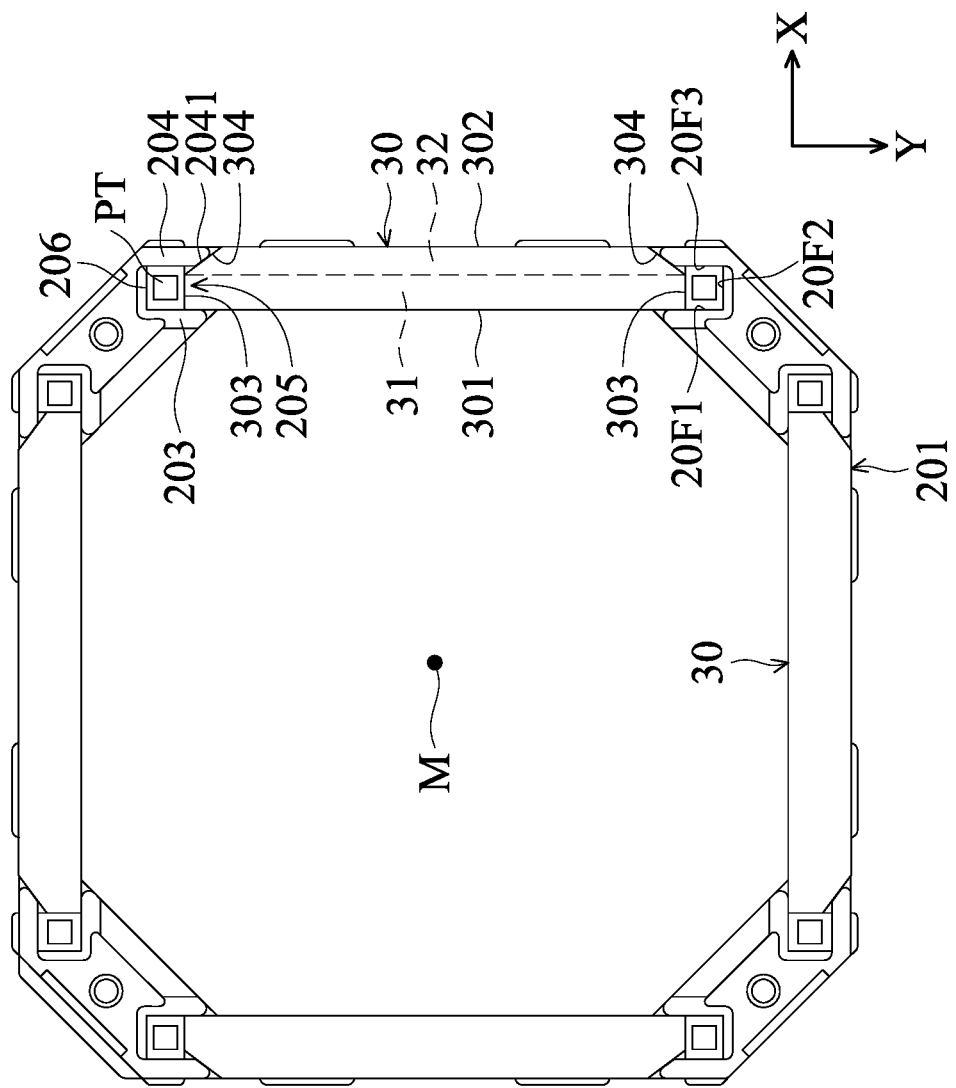
FIG. 3 shows an exploded view of partial elements of an electromagnetic driving module, in accordance with some embodiments.

Referring to FIG. 3, in some embodiments, the four magnetic elements 30 are magnets. Each magnetic element 30 is disposed on one of the lateral frame members 201 and extends in a direction that is parallel to the extension direction of the corresponding lateral frame members 201. In the embodiment shown in FIG. 3, each magnetic element 30 includes a first segment 31 and a second segment 32 connected to the first segment 31. In a plane that is perpendicular to the main axis M, the first segment 31 has a rectangular cross section, and the second segment 32 has a trapezoidal cross section.

Each magnetic element 30 has a rear surface 301 and a front surface 302, two connecting surfaces 303, and two engaging surfaces 304. The rear surface 301 and the two connecting surfaces 303 are located at the first segment 31. The front surface 302 and the two engaging surfaces 304 are located at the second segment 32. The rear surface 301 is opposite to the front surface 302. The two engaging surfaces 304 are respectively connected to two sides of the front surface 302 and form two obtuse angles with the front surface 302. The two connecting surfaces 303 are respectively connected to two sides of the rear surface 301 and form two right angles with the rear surface 301.

In some embodiments, in the plane perpendicular to the main axis M, two connecting surfaces 303 are symmetrically arranged with respect to the center of the magnetic element 30, and two engaging surfaces 304 are symmetrically arranged with respect to the center of the magnetic element 30. In some embodiments, in a direction that is parallel to the main axis M, the magnetic element 30 has a fixed height. Additionally, in the plane perpendicular to the main axis M, the length of the rear surface 301 is greater than the length of the front surface 302. As a result, the area of the rear surface 301 is greater than the area of the front surface 302.

During assembly, each of the magnetic elements 30 is inserted into the two receiving grooves 205 via the upper opening thereof and is fixed on the bottom portion 202 of the lateral frame member 201 by suitable means (such as gluing). In the case of the magnetic element 30 being fixed on the lateral frame member 201 by glue, any excessive glue may be stored in the receiving groove 205 so as to prevent an overflowing of glue. In some embodiments, other magnetic elements are buried in the bottom portion 202 of the frame 20, and the magnetic elements 30 are fixed on the frame 20 via the magnetic attraction force.

After assembly, two sides of the magnetic element 30 are respectively placed within the two receiving grooves 205. In addition, the rear surface 301 of the magnetic element 30 is in contact with the two inner side block portions 203, and the engaging surfaces 304 are in contact with the two outer side block portions 204. In the case of cutting edges 2041 being formed on the outer side block portions 204, the engaging surfaces 304 are parallel to and in contact with the surface of the cutting edge 2041. Furthermore, referring to FIG. 2, there are several surfaces can be defined: the inner side block portion 203 has a first frame surface 20F1, a lateral side block portion 206 of the lateral frame member 201 has a second frame surface 20F2, the other side portion 204 has a third frame surface 20F3, and the bottom portion has a fourth frame surface 20F4.

Figure 4:
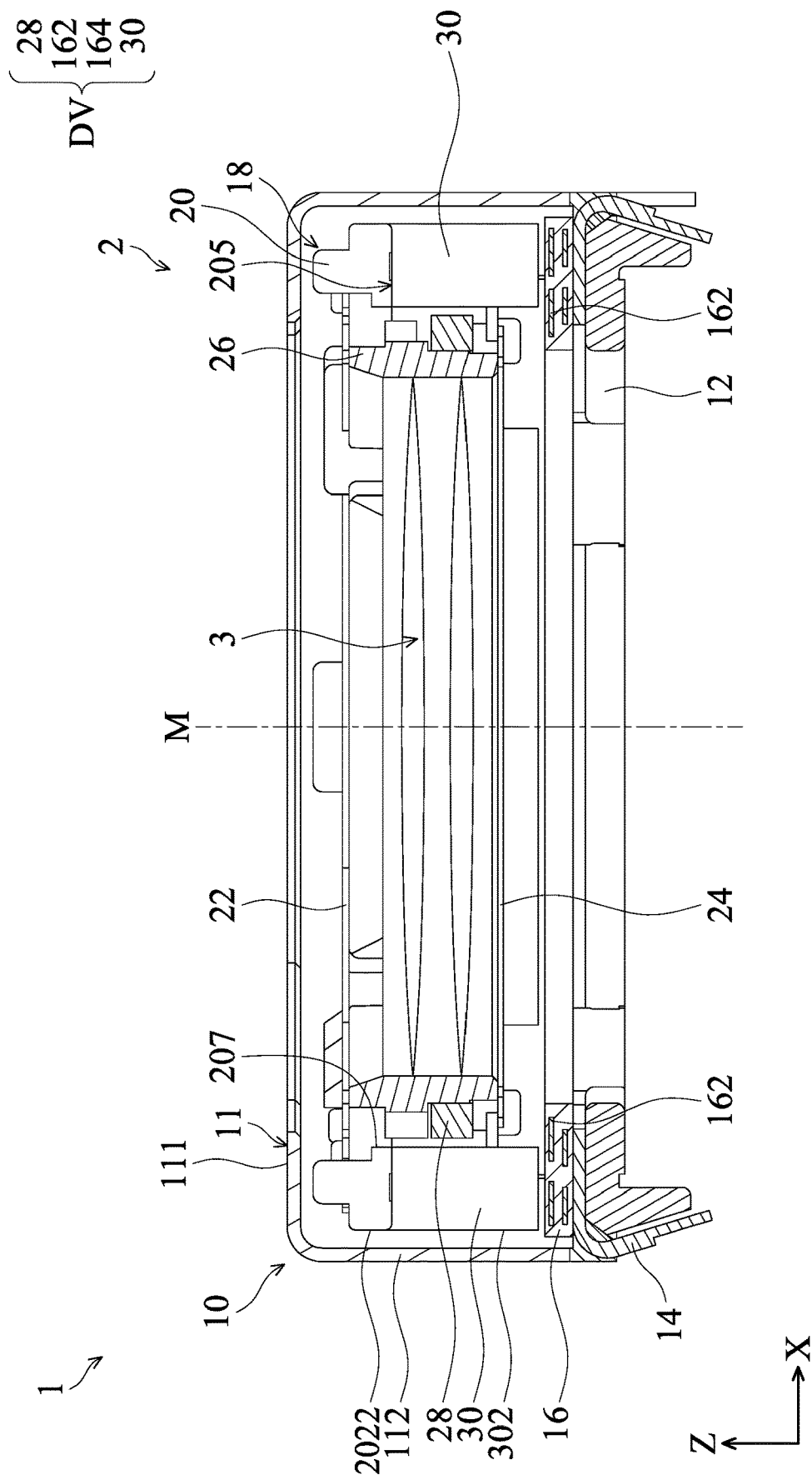
FIG. 4 shows a cross-sectional view of an electromagnetic driving module, in accordance with some embodiments.

Referring to FIG. 4, with the frame 20, the four magnetic elements 30 are positioned corresponding to the focusing driving coil 28 and positioned corresponding to the OIS driving coils 162 and 164. Additionally, one magnetic pole of each magnetic element 30, such as the N pole, faces the lens holder 26, and the other magnetic pole of each magnetic element 30, such as the S pole, faces the lateral housing member 112. In some embodiments, the driving coils 28, 162, 164 and the magnetic elements 30 can constitute an OIS driving assembly DV, or the OIS driving assembly DV includes at least a coil and a magnetic element.

Moreover, when the magnetic element 30 is placed in the frame 20, the distance from the outer surface 2022 of the frame 20 to the lateral housing member 112 is equal to or smaller than the distance from the front surface 301 of the magnetic element 30 to the lateral housing member 112. For example, a protrusion (stopper) may be formed on the outer surface 2022 of the frame 20 as a stopper to limit the movement of the frame 20 as the frame moves toward the lateral housing member 112 or other elements. In addition, the entire area of the front surface 302 of the magnetic element 30 directly faces the lateral housing member 112 (i.e., no area of the front surface 302 being covered by the frame 20).

When the electromagnetic driving module 2 is in operation, the control module (not shown in figures) transmits electric current to the OIS driving coils 162 and 164. By the magnetic force produced between the OIS driving coils 162 and 164 and the magnetic element 30, the movable portion 18 is moved in a direction that is perpendicular to the main axis M relative to the fixed portion 10 so as to keep the optical axis of the lens assembly 3 in alignment with the main axis M. In addition, to change the focusing position of the lens assembly, the control module (not shown in figures) transmits electric current to the focusing driving coil 28. Afterwards, the lens holder 26 is moved in the main axis M relative to the fixed portion 10 by the magnetic force produced between the focusing driving coils 28 and the magnetic element 30.

During the operation of the electromagnetic driving module 2, one or more detection assemblies (not shown in the figures) are used to detect changes in the magnetic field of the magnetic elements 30 and to produce electric signals to the control module (not shown in the figures) according to the detected result, so as to establish a closed-loop control.

Figure 5:
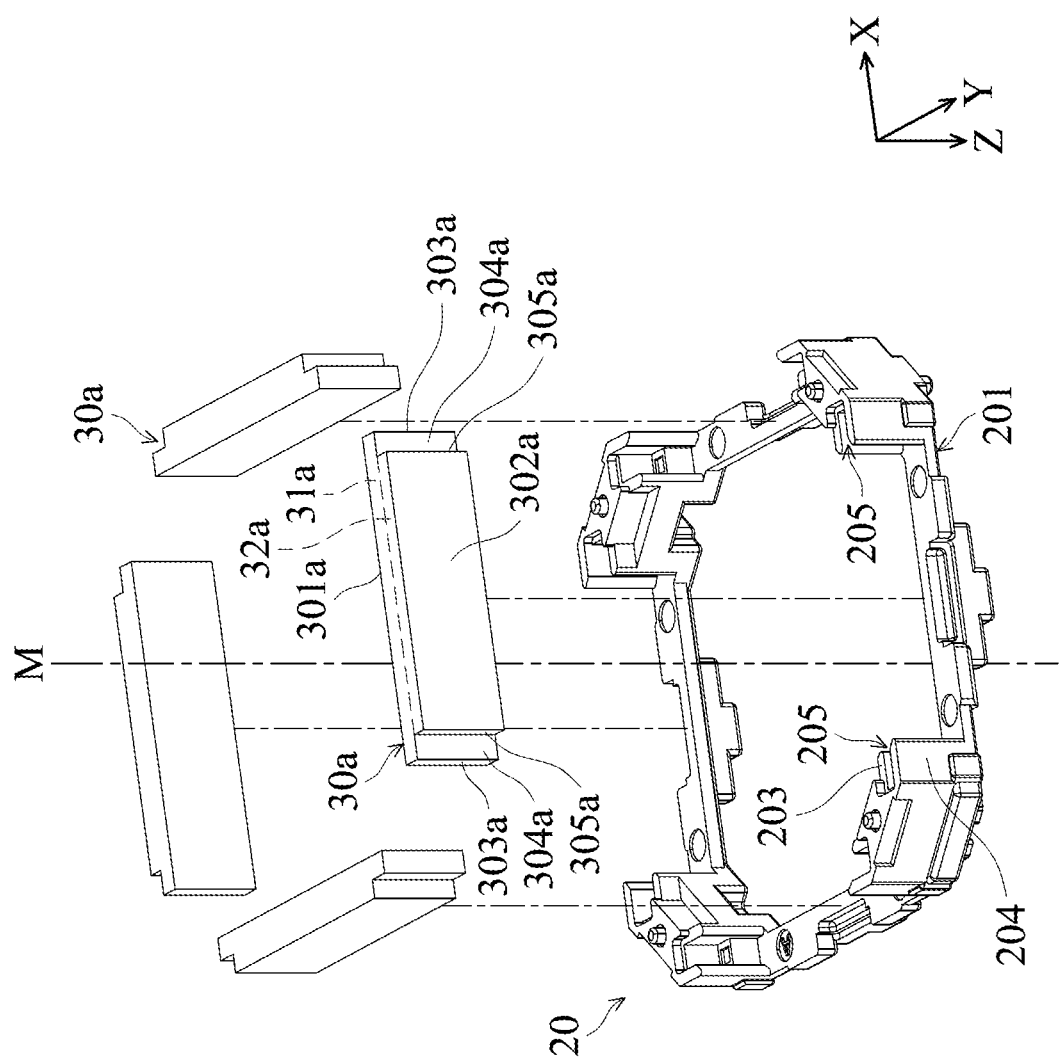
FIG. 5 shows an exploded view of partial elements of an electromagnetic driving module, in accordance with some embodiments.

FIG. 5 shows an exploded view of partial elements of a frame 20 and magnetic elements 30a, in accordance with some embodiments. In the embodiment shown in FIG. 5, elements that are identical with or similar to the elements shown in FIG. 2 are designated by the same reference number, and the features thereof are not repeated for the purpose of brevity.

In some embodiments, the four magnetic elements 30a are magnets. Each magnetic element 30a includes a first segment 31a and a second segment 32a connected to the first segment 21a. In a plane that is perpendicular to the main axis M, the first segment 31a has a rectangular cross section, and the second segment 32a has a rectangular cross section.

Each magnetic element 30a has a rear surface 301a and a front surface 302a, two first connecting surfaces 303a, two engaging surfaces 304a, and two second connecting surfaces 305a. The rear surface 301a, the two first connecting surfaces 303a, and two engaging surfaces 304a are located at the first segment 31a. The front surface 302a and the two second connecting surfaces 304a are located at the second segment 32a. The rear surface 301a is opposite to the front surface 302a. The two first connecting surfaces 303a are respectively connected to two sides of the rear surface 301a and form two right angles with the rear surface 301a. The two second connecting surfaces 305a are respectively connected to two sides of the front surface 302a and form two right angles with the front surface 302a. Each engaging surface 304a connects one of the first connecting surfaces 303a to the neighboring second connecting surface 305a and forms two right angles relative to the first connecting surfaces 303a and the second connecting surface 305a.

In some embodiments, in the plane perpendicular to the main axis M, the two first connecting surfaces 303a, the two engaging surface 304a, and the two second connecting surfaces 305a are symmetrically arranged with respect to the center of the magnetic element 30a. In some embodiments, in a direction that is parallel to the main axis M, the magnetic element 30a has a fixed height. Additionally, in the plane perpendicular to the main axis M, the length of the rear surface 301a is greater than the length of the front surface 302a. As a result, the area of the rear surface 301a is greater than the area of the front surface 302a.

During assembly, each of the magnetic elements 30a is inserted into the two receiving grooves 205 via the upper opening thereof and is fixed on the bottom portion 202 of the lateral frame member 201 by suitable means (such as gluing). After assembly, two portions of magnetic element 30a that are adjacent to the first connecting surface 303a are respectively placed within the two receiving grooves 205. In addition, the rear surface 301a of the magnetic element 30a is in contact with the inner side block portions 203, and the two engaging surfaces 304a are in contact with the outer side block portions 204.

Figure 6:
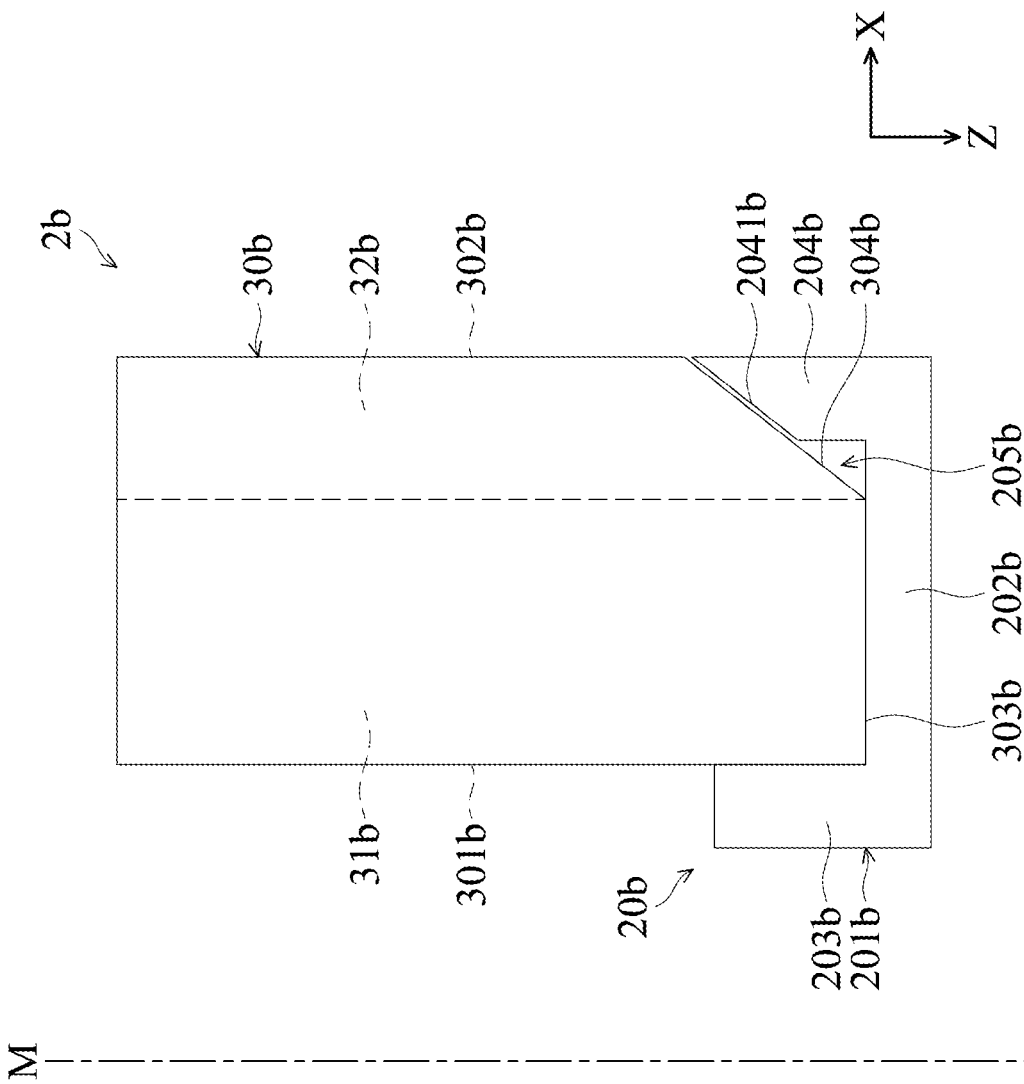
FIG. 6 shows a cross-sectional view of partial elements of an electromagnetic driving module, in accordance with some embodiments.

FIG. 6 shows an exploded view of partial elements of a frame 20b and a magnetic element 30b of an electromagnetic driving module 2, in accordance with some embodiments. In the embodiment shown in FIG. 6, elements that are identical with or similar to the elements shown in FIG. 2 are designated by the same reference number, and the features thereof are not repeated for the purpose of brevity.

In some embodiments, the frame 20b has a substantially rectangular shape and includes four lateral frame members 201b (only one lateral frame member 201b is shown in FIG. 5) surrounding the main axis M and connected to one another. Each of the lateral frame members 201b includes a bottom portion 202b, an inner side block portion 203b, and an outer side block portion 204b. The inner side block portion 203b and the outer side block portion 204b are positioned on the bottom portion 202b and define two receiving grooves 205b for receiving the magnetic element 30b. In some embodiments, the end of the outer side block portion 204b that is away from the bottom portion 202b has a cutting edge 2041b for facilitating the positioning of the magnetic element 30b and improving the stability of the magnetic element 30b.

In some embodiments, the four magnetic elements 30b are magnets. Each magnetic element 30b includes a first segment 31b and a second segment 32b connected to the first segment 31b. In a plane that is parallel to the main axis M, the first segment 31b has a rectangular cross section, and the second segment 32b has a trapezoidal cross section.

Each magnetic element 30b has a rear surface 301b and a front surface 302b, a connecting surface 303b, and an engaging surface 304b. The rear surface 301b and the connecting surface 303b are located at the first segment 31b. The front surface 302b and the engaging surface 304b are located at the second segment 32b. The rear surface 301b is opposite to the front surface 302b. The connecting surface 303b connects a side of the rear surface 301b to the engaging surface 304b and forms a right angle with the rear surface 301b. The engaging surface 304b connects a side of the front surface 302b and forms an obtuse angle with the front surface 302b.

In some embodiments, in a direction that is perpendicular to the main axis M, the magnetic element 30b has a fixed thickness. Additionally, in the plane parallel to the main axis M, the height of the rear surface 301b is greater than the height of the front surface 302b. As a result, the area of the rear surface 301b is greater than the area of the front surface 302b.

During assembly, each of the magnetic elements 30b is inserted into the receiving groove 205b via the upper opening thereof and is fixed on the bottom portion 202b of the lateral frame member 201b by suitable means (such as gluing).

After assembly, the portion of the magnetic element 30b that is adjacent to the connecting surface 303b is placed within the receiving groove 205b. In addition, the rear surface 301b of the magnetic element 30b is in contact with the inner side block portion 203b, and the front surface 302b of the magnetic element 30b is in contact with the outer side block portion 204b. In the case of cutting edge 2041b being formed on the outer side block portion 204b, the engaging surface 304b is parallel to and in contact with the surface of the cutting edge 2041b.

Figure 7:
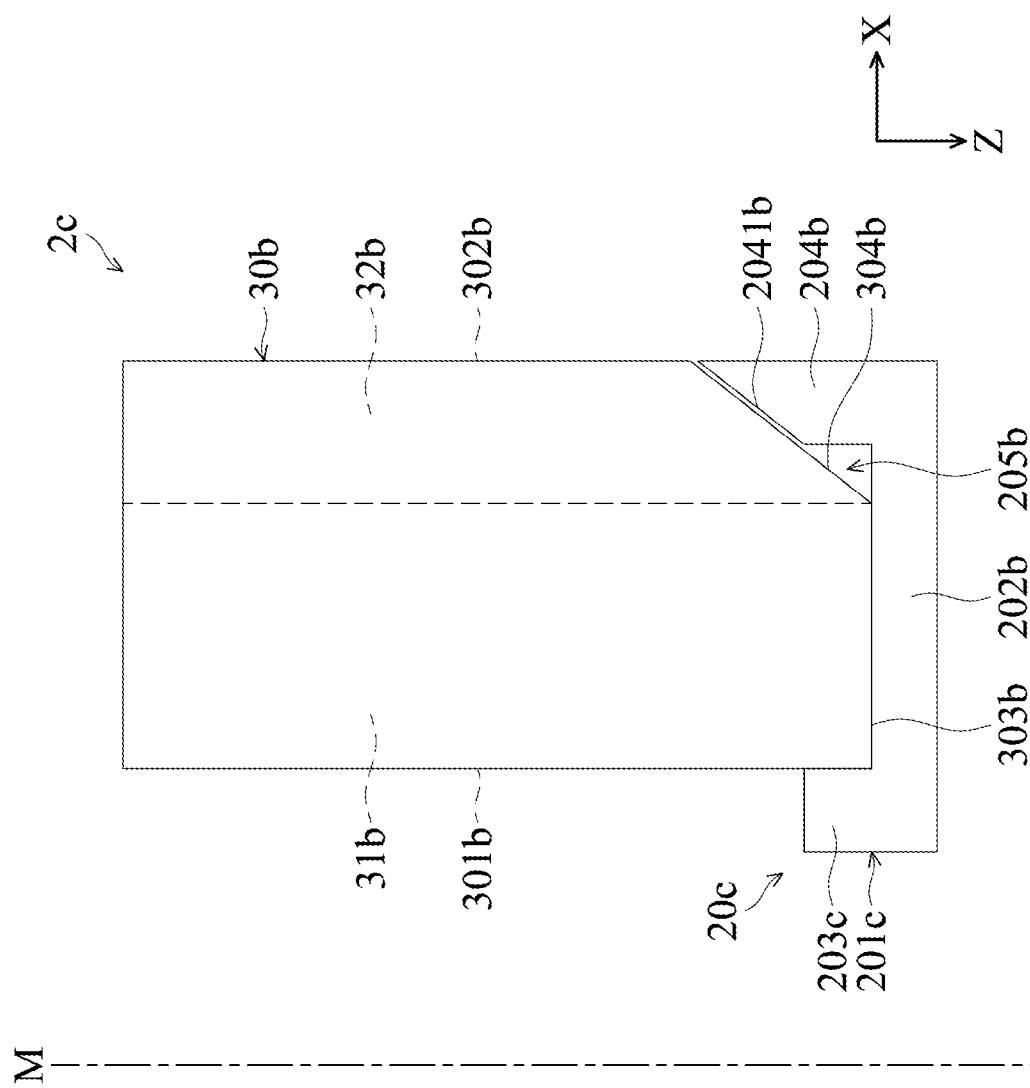
FIG. 7 shows a cross-sectional view of partial elements of an electromagnetic driving module, in accordance with some embodiments.

FIG. 7 shows an exploded view of partial elements of a frame 20c and the magnetic element 30b of an electromagnetic driving module 2c, in accordance with some embodiments. In the embodiment shown in FIG. 7, elements that are identical with or similar to the elements shown in FIG. 6 are designated by the same reference number, and the features thereof are not repeated for the purpose of brevity.

Differences between the frame 20c and the frame 20b of FIG. 6 includes the height of an inner side block portion 203c of a lateral frame member 201c being less than the height of an outer side block portion 204b of the lateral frame member 201b. Since the exposure area of the magnetic element 30b to the coil (not shown in FIG. 7) is increased, and the driving force is improved.

Figure 8:
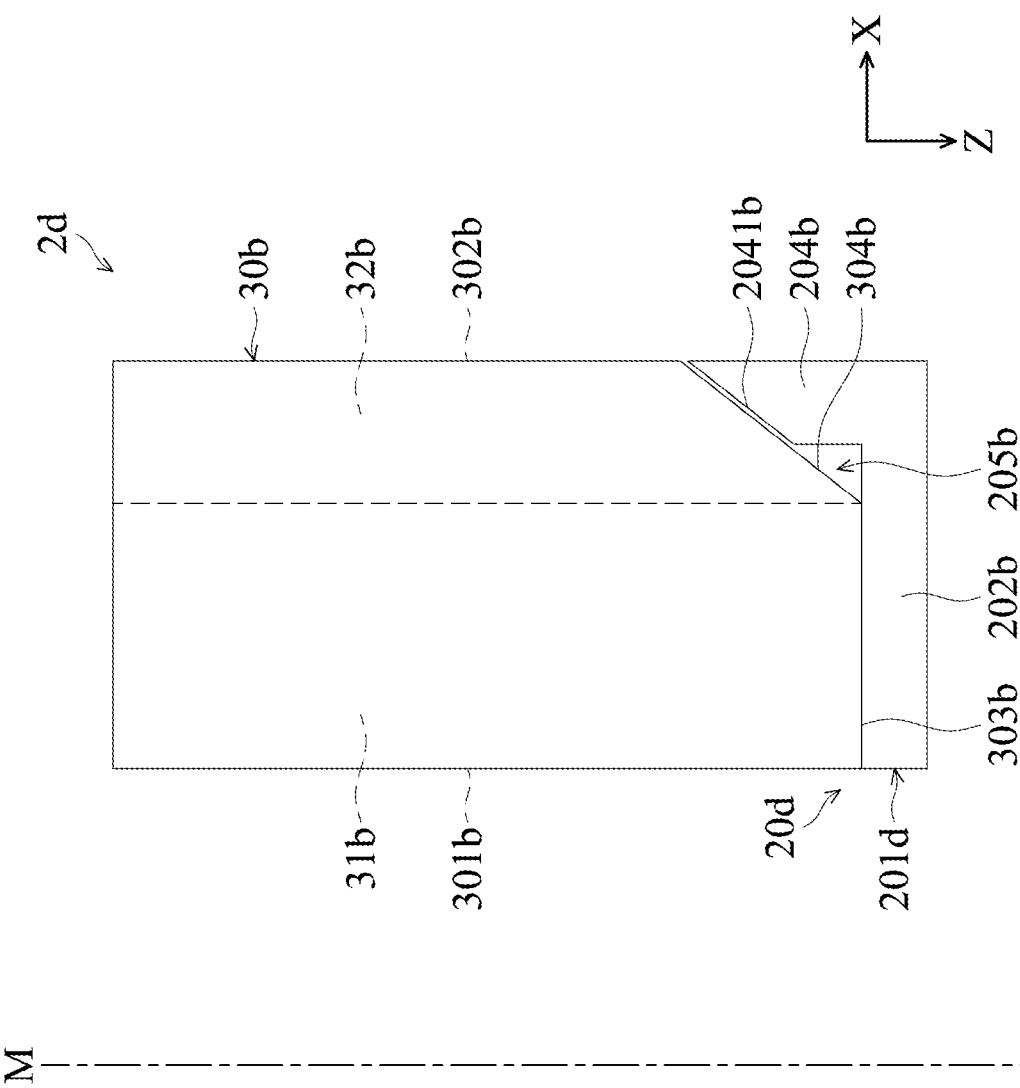
FIG. 8 shows a cross-sectional view of partial elements of an electromagnetic driving module, in accordance with some embodiments.

FIG. 8 shows an exploded view of partial elements of a frame 20d and the magnetic element 30b of an electromagnetic driving module 2d, in accordance with some embodiments. In the embodiment shown in FIG. 8, elements that are identical with or similar to the elements shown in FIG. 6 are designated by the same reference number, and the features thereof are not repeated for the purpose of brevity.

Differences between the frame 20d and the frame 20b of FIG. 6 include the absence of the inner side block portion on a lateral frame member 201d of a frame 20d. Since the exposure area of the magnetic element 30b to the coil (not shown in FIG. 8) is increased, and the driving force is improved.

Embodiments of the electromagnetic driving module having the magnetic element that connects to the frame via the engaging surface. Since the engaging surface is not located at the inner-most or outer-most surface of the magnetic element in the direction that is perpendicular to the main axis, the structure of the frame that is used to engage with the engaging surface is formed in a position closer to the main axis than the of a conventional frame. As a result, the width of the frame in the direction that is perpendicular to the main axis is reduced (in one exemplary embodiments, the frame has a width that is smaller than that of the conventional frame by 0.24 mm to 0.30 mm). This feature not only facilitates the size reduction of the electromagnetic driving module, but also increases the amount of active displacement and the compensation angle of the moveable portion. In addition, as being securely held by the frame, the magnetic element will not easily become detached from the frame as an external attacking force is applied. As a result, the structural strength of the electromagnetic driving module is increased.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens driving module, comprising: a frame, surrounding a main axis; a base, the frame movably connected to the base; and an OIS driving assembly, configured to drive the frame to move relative to the base, including: a magnetic element, disposed on the frame, the magnetic element including: a rear surface, parallel to and facing the main axis, and the rear surface is parallel to and faces a first frame surface of the frame; and a connecting surface, adjacent to the rear surface and parallel to the main axis, wherein the rear surface and the connecting surface are not parallel, and the connecting surface faces a second frame surface of the frame; and an OIS driving coil, corresponding to the magnetic element, wherein the frame includes: an inner side block portion, wherein the first frame surface is located on the inner side block portion and faces the rear surface of the magnetic element; a lateral side block portion, wherein the second frame surface is located on the lateral side block portion and faces the connecting surface of the magnetic element; and an outer side block portion, wherein the frame has a third frame surface located on the outer side block portion and faces a front surface of the magnetic element, wherein the first frame surface is connected to the third frame surface via the second frame surface, the first, second and third frame surfaces respectively face different directions, wherein when viewed along a direction that is perpendicular to the first frame surface, the first and third frames at least partially overlap each other, and wherein the first, second and third frame surfaces are parallel to the main axis, and the shortest distance between the rear surface of the magnetic element and the first frame surface is less than the shortest distance between the connecting surface of the magnetic element and the second frame surface.

2. The lens driving module as claimed in claim 1, wherein the frame further includes a receiving groove which is extending along the main axis direction and corresponding to the connecting surface of the magnetic element, and a gap is between the connecting surface of the magnetic element and the second frame surface.

3. The lens driving module as claimed in claim 2, wherein the frame further includes a protruding stage disposed in the receiving groove, and the protruding stage is extending from a fourth frame surface of the frame, and wherein the fourth frame surface is perpendicular to the main axis along the main axis.

4. The lens driving module as claimed in claim 2, wherein when viewing along the main axis direction, the receiving groove of the frame has a C-shaped structure.

5. The lens driving module as claimed in claim 2, wherein the magnetic element further includes a plurality of connecting surfaces which are adjacent to the rear surface and parallel to the main axis, and the frame further includes a plurality of the receiving grooves which are respectively corresponding to the connecting surfaces.

6. The lens driving module as claimed in claim 2, wherein when viewing from the direction perpendicular to the main axis direction, magnetic element is at least partially overlaps the receiving groove.

7. The lens driving module as claimed in claim 6, further comprising a lateral housing member extending along a direction that is parallel to the main axis, wherein the smallest distance between the lateral housing member and the outer surface of the frame is less than or equal to the distance between lateral housing member and the magnetic element.

8. The lens driving module as claimed in claim 2, wherein the rear surface of the magnetic element is directly in contact with the first frame surface.

9. The lens driving module as claimed in claim 2, wherein the magnetic element further comprises the front surface opposite to the rear surface, and wherein the outer side block portion is arranged to correspond to the inner side block portion and spaced from the inner side block portion by a gap, wherein the receiving groove defined between the inner side block portion and the outer side block portion, and the magnetic element is placed in the receiving groove.

10. The lens driving module as claimed in claim 9, wherein the magnetic element further comprises an engaging surface, and the engaging surface is immediately connected to the front surface and forms an obtuse angle with the front surface, and wherein the rear surface of the magnetic element is in contact with the inner side block portion, and the engaging surface is in contact with the outer side block portion.

11. The lens driving module as claimed in claim 9, wherein the magnetic element further comprises an engaging surface, and the engaging surface extends parallel to the front surface, and wherein the rear surface of the magnetic element is in contact with the inner side block portion, and the engaging surface is in contact with the outer side block portion.

12. The lens driving module as claimed in claim 9, wherein the magnetic element further comprises:

a first segment having a rectangular cross section; and
a second segment having a trapezoidal cross section and connected to the first segment, and wherein the rear surface is located at the first segment, and the front surface is located at the second segment.

13. The lens driving module as claimed in claim 9, wherein the magnetic element further comprises:
   a first segment having a rectangular cross section; and
   a second segment having a rectangular cross section and connected to the first segment, and
   wherein the rear surface is located at the first segment, and the front surface is located at the second segment.

14. The lens driving module as claimed in claim 2, further comprising:
   a lens holder arranged on the main axis, wherein the frame surrounds the lens holder; and
   a focusing driving coil arranged corresponding to magnetic element and disposed on the lens holder, wherein the focusing driving coil allows an electric current to pass through so as to drive the movement of the lens holder along the main axis.

\* \* \* \* \*